(12) United States Patent
Georgiou et al.

(10) Patent No.: US 11,381,082 B2
(45) Date of Patent: Jul. 5, 2022

(54) METHOD OF MANAGING ELECTRICITY PROVIDING IN A COMPUTERS CLUSTER

(71) Applicant: BULL SAS, Les Clayes sous Bois (FR)

(72) Inventors: Yiannis Georgiou, Lyons (FR); Andry Razafinjatovo, Renage (FR); David Glesser, Uriage (FR)

(73) Assignee: BULL SAS, Les Clayes sous Bois (FR)

( * ) Notice: Subject to any disclaimer, the term of this patent is extended or adjusted under 35 U.S.C. 154(b) by 156 days.

(21) Appl. No.: 16/612,094

(22) PCT Filed: May 11, 2017

(86) PCT No.: PCT/IB2017/000724
§ 371 (c)(1),
(2) Date: Nov. 8, 2019

(87) PCT Pub. No.: WO2018/206993
PCT Pub. Date: Nov. 15, 2018

(65) Prior Publication Data
US 2020/0099224 A1 Mar. 26, 2020

(51) Int. Cl.
*H02J 3/14* (2006.01)
*G06Q 10/06* (2012.01)
(Continued)

(52) U.S. Cl.
CPC .......... *H02J 3/14* (2013.01); *G06Q 10/06315* (2013.01); *G06Q 30/0206* (2013.01);
(Continued)

(58) Field of Classification Search
CPC ........ H02J 3/14; H02J 3/06; H02J 3/32; H02J 3/383; H02J 3/386; H02J 3/003;
(Continued)

(56) References Cited

U.S. PATENT DOCUMENTS

2011/0040550 A1 2/2011 Graber et al.
2011/0173470 A1* 7/2011 Tran ...................... G06F 1/3287
713/323
(Continued)

FOREIGN PATENT DOCUMENTS

CN 103888049 A 6/2014
EP 2 172 887 4/2010
(Continued)

OTHER PUBLICATIONS

Anonymous: "Load balancing (electrical power)—Wikipedia", Apr. 19, 2017 (Apr. 19, 2017), XP055392754, Retrieved from the Internet: URL:https://en.wikipedia.org/w/index.php?title=Load balancing_(electrical_power)&oldid=776251874 [retrieved on Jul. 20, 2017] p. 1-p. 2.

(Continued)

*Primary Examiner* — Ziaul Karim
(74) *Attorney, Agent, or Firm* — Meagher Emanuel Laks Goldberg & Liao, LLP

(57) ABSTRACT

Disclosed is a method of managing electricity providing in a computers cluster, including: a process of prediction of need of electricity provided by at least one renewable electricity source in the computers cluster, a process of prediction of availability of the electricity provided by the renewable electricity source, including: a step of managing failure risk of the renewable electricity source, by lowering the predicted availability, so as to: increase life expectancy of the renewable electricity source, and/or lower maintenance frequency of the renewable electricity source, a process of scheduling tasks in the computers cluster, based on both the prediction processes.

27 Claims, 1 Drawing Sheet

(51) Int. Cl.
*G06Q 30/02* (2012.01)
*H02J 3/06* (2006.01)
*H02J 3/32* (2006.01)
*H02J 3/38* (2006.01)
*H02J 3/00* (2006.01)
*G06Q 50/06* (2012.01)

(52) U.S. Cl.
CPC ............... *H02J 3/06* (2013.01); *H02J 3/32* (2013.01); *H02J 3/383* (2013.01); *H02J 3/386* (2013.01); *G06Q 50/06* (2013.01); *H02J 3/003* (2020.01)

(58) Field of Classification Search
CPC .... H02J 3/381; H02J 2300/24; H02J 2300/20; H02J 2300/28; H02J 2310/12; H02J 3/28; H02J 3/38; G06Q 10/06315; G06Q 30/0206; G06Q 50/06; Y02B 70/3225; Y04S 20/222; Y02E 10/76; Y02E 70/30; Y02E 10/56
See application file for complete search history.

(56) References Cited

U.S. PATENT DOCUMENTS

| | | | |
|---|---|---|---|
| 2012/0155704 A1* | 6/2012 | Williams | G01W 1/00 382/103 |
| 2012/0201675 A1 | 8/2012 | Friedrich | |
| 2013/0151012 A1* | 6/2013 | Shetty | H02J 3/0075 700/276 |
| 2014/0075222 A1* | 3/2014 | Jackson | G06F 1/3234 713/320 |
| 2014/0128001 A1* | 5/2014 | Imes | G05F 1/66 455/41.2 |
| 2014/0156031 A1* | 6/2014 | Anderson | G06Q 10/06 700/29 |
| 2014/0224894 A1 | 8/2014 | MacDonald | |
| 2014/0244328 A1 | 8/2014 | Zhou et al. | |
| 2015/0280436 A1* | 10/2015 | Weckx | G06Q 50/06 700/295 |

FOREIGN PATENT DOCUMENTS

| | | |
|---|---|---|
| EP | 2 560 136 | 2/2013 |
| JP | 359072309 | 4/1984 |
| WO | WO 2015/099857 | 7/2015 |

OTHER PUBLICATIONS

Anonymous: "Load management—Wikipedia", Jan. 21, 2016 (Jan. 21, 2016), XP055392751, Retrieved from the Internet: URL:https://en.wikipedia.org/w/index.php?title=Load_management&oldid=700955413 [retrieved on Jul. 20, 2017] p. 1-p. 2.
International Search Report, PCT/IB2017/000724, dated Jul. 31, 2017.
Written Opinion, PCT/IB2017/000724, dated Jul. 31, 2017.
Office Action for corresponding EP Application No. 17732214.6, dated Jun. 17, 2021.

* cited by examiner

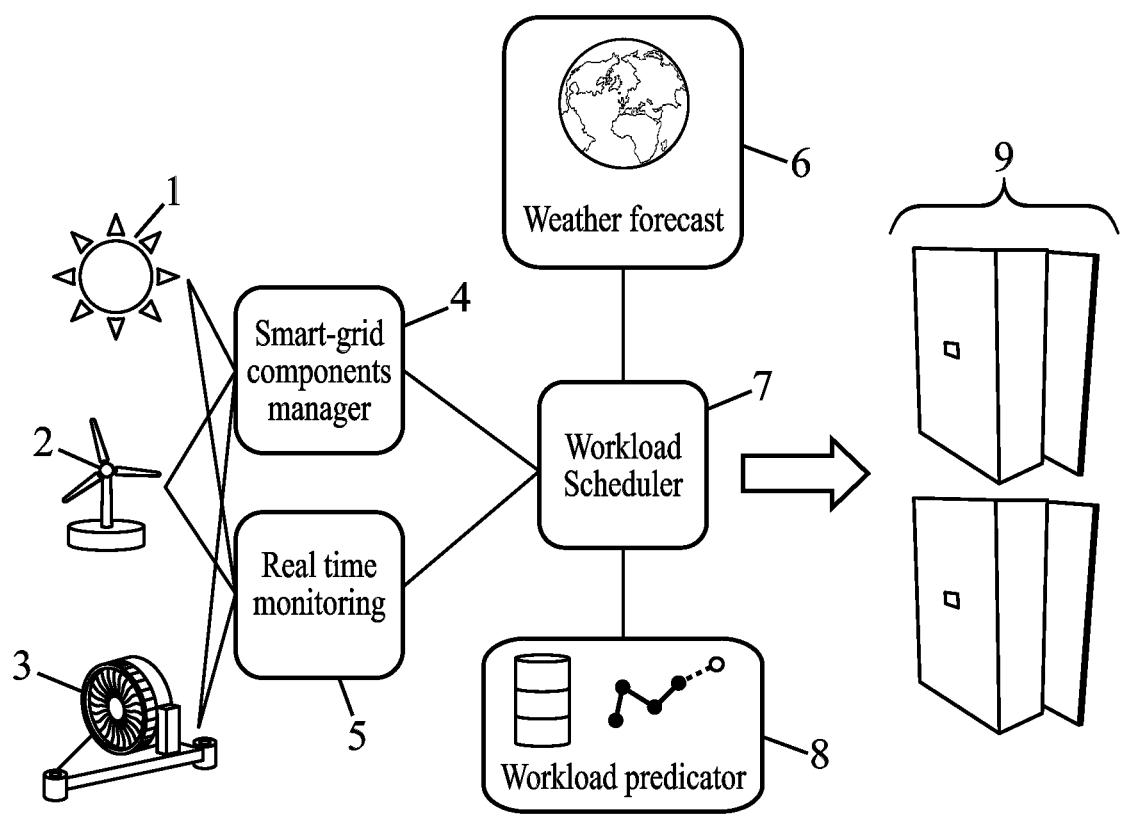

METHOD OF MANAGING ELECTRICITY PROVIDING IN A COMPUTERS CLUSTER

FIELD OF THE INVENTION

The invention relates to a method of managing electricity providing in a computers cluster, as well as a method of operating a computers cluster including a method of managing electricity providing in a computers cluster and a method of scheduling tasks in this computers cluster.

BACKGROUND OF THE INVENTION

According to a prior art, when managing a computers cluster, since this cluster comprises so many computers, sometimes at least several hundred computers, or even at least several thousand computers, to optimize the scheduling of the numerous tasks to be performed within the cluster is quite difficult, all the more than there is at least one or more renewable electricity sources which are used in order to lower global energy consumption cost for the cluster.

Indeed, taking into account many parameters, like the number of tasks to be performed, the computing resources required by these tasks, the deadlines associated to these tasks, and when appropriate, all these parameters varying over time, makes scheduling tasks in a computers cluster rather difficult.

A computers cluster needs at least one energy source to perform the required tasks, this energy source being electricity. When scheduling tasks, the managing system has to take into account, the availability of electricity to supply power to the computers cluster. This usually includes for example the maximum available electrical power and unavailability time slots for repair and maintenance.

But, since the scheduling process is already rather complicated, the supplementary parameter of failure risk of renewable electricity source is not taken into account. This supplementary parameter of failure risk of renewable electricity source is considered as disturbing the efficiency of the scheduling process and therefore not used.

Indeed, an algorithm that schedules tasks in a high performance computers cluster is hard to make because the scheduling decisions have to be done quickly according to multiple constraints and should control a possible large number of computing resources.

Then, taking into account failure risk of renewable electricity source variation is even more difficult because it add some constraints to the already complex scheduling algorithm.

However, according to the invention, in a cluster including a large number of computers, it becomes very interesting to manage the cluster operation according to the varying failure risk of renewable electricity source over time. Besides, disturbance of scheduling is not that high when including as parameter the failure risk of renewable electricity source. Moreover, when managing this supplementary parameter the right way, such disturbance can be substantially lowered and even cancelled, while cost savings, because of inclusion of this supplementary parameter, become substantial in a cluster comprising a big number of computers.

SUMMARY OF THE INVENTION

The object of the present invention is to alleviate at least partly the above mentioned drawbacks.

More particularly, the invention aims to take into account the failure risk of renewable electricity source variations over time, when scheduling tasks in a computers cluster, and especially in a cluster including many computers. The management of the failure risk of renewable electricity source is performed by lowering the predicted availability of electricity provided by at least one renewable electricity source, so as to reduce this failure risk of renewable electricity source, when this failure risk of renewable electricity source would be the higher without such management.

Such failure risk of renewable electricity source is best managed when predicted availability of electricity provided by a renewable electricity source is lowered so as to increase life expectancy of this renewable electricity source and/or lower maintenance frequency of this renewable electricity source.

This object is achieved with a method of managing electricity providing in a computers cluster, comprising: a process of prediction of need of electricity provided by at least one renewable electricity source in said computers cluster, a process of prediction of availability of said electricity provided by said renewable electricity source, including: a step of managing failure risk of said renewable electricity source, by lowering said predicted availability, so as to: increase life expectancy of said renewable electricity source, and/or lower maintenance frequency of said renewable electricity source, a process of scheduling tasks in said computers cluster, based on both said prediction processes.

According to preferred embodiments of the invention, an electricity cost aware workload scheduling is performed, preferably with one or more renewable electricity sources. Workload scheduling is then performed in high performance computing clusters by taking into account the failure risk of renewable electricity source in a context where it presents variations over time due to both full or reduced speed utilization as well as extreme or standard meteorological conditions.

Preferred embodiments comprise one or more of the following features, which can be taken separately or together, either in partial combination or in full combination.

Preferably, said process of prediction of availability of said electricity provided by said renewable electricity source, also includes: a step of prediction of electricity price provided by said renewable electricity source. This way, availability of said electricity provided by said renewable electricity source is modulated by electricity price provided by said renewable electricity source, what helps lowering the overall cost of used electricity.

Preferably, said process of prediction of need of electricity provided by said renewable electricity source in said computers cluster, also includes: a step of prediction of workload in said computers cluster. This way, need of electricity provided by said renewable electricity source in said computers cluster is modulated by workload in said computers cluster, what helps adapting electricity production by renewable electricity sources to the real needs of said computers cluster, and this is preferably real time performed.

Preferably, said step of prediction of workload in said computers cluster is partly based on historical data of said computers cluster. This way, variations of workload predictions are somewhat smoothed by the consideration of the past workload variations, in order to avoid too big and too frequent surprises then leading to completely review workload predictions.

Preferably, it also includes a process of dynamical reconfiguration of said renewable electricity source, according both to last need prediction and to last availability prediction, said process of prediction of availability then taking into account renewable electricity source reconfiguration update. This way, this dynamical reconfiguration of the renewable electricity source allows for better real time adaptation of this renewable electricity source to both electricity need and availability.

Preferably, in case of need prediction decrease because of workload decrease, said renewable electricity source will be reconfigured so as: not running all the time, and/or not running at full speed when running. This way, failure risk of this renewable electricity source will be lowered without reducing notably working efficiency of this computers cluster.

Preferably, in case of need prediction decrease because of workload decrease, said renewable electricity source will be reconfigured so as: provide extra electricity to the grid if it accepts it at that time, preferably in a stable way, and/or provide extra electricity to backup rechargeable batteries if they are not sufficiently filled, or, in case both said grid does not accept and said backup rechargeable batteries are sufficiently filled, said renewable electricity source will be reconfigured so as to automatically fit actual need prediction but not more. This way, either this renewable electricity source provides for more electricity than strictly needed by the computers cluster and this extra electricity is most usefully required elsewhere, or this renewable electricity source provides for no more electricity than strictly needed by the computers cluster and the failure risk of either this renewable electricity source is minimized.

Preferably, in case of availability prediction decrease because of extreme meteorological events, said renewable electricity source will be reconfigured so as: either not running all the time, and/or not running at full speed when running. This way, failure risk of this renewable electricity source will be lowered without reducing notably working efficiency of this computers cluster.

Preferably, in case of availability prediction decrease because of extreme meteorological events, said renewable electricity source will be reconfigured so as to automatically fit actual need prediction but not more. This way, this renewable electricity source provides for no more electricity than strictly needed by the computers cluster and the failure risk of either this renewable electricity source is minimized, in a situation where it would have otherwise been quite high.

Preferably, said renewable electricity source reconfiguration control is performed by real time sensors integrated in said renewable electricity source. This way, the management of this renewable electricity source is made autonomous, at the level of each of these renewable electricity sources.

Preferably, said process of prediction of availability also includes: a step of evaluation of electricity providing at full speed by said renewable electricity source, based on weather forecasting data. This way, real time maximum of electricity providing is determined for the renewable electricity source or for each of the renewable electricity sources, thereby giving the maximal electricity availability for the renewable electricity source or for each of the renewable electricity sources.

Preferably, said weather forecasting data come from a source external to said computers cluster, preferably from a web application programming interface. This way, getting such interesting information, allowing for determining which renewable electricity source can provide for which electricity amount at which time, can be made easily and at a reasonable cost.

Preferably, said process of dynamical reconfiguration of said renewable electricity source uses a smart grid components manager, said process of scheduling tasks in said computers cluster uses a workload scheduler holding a queue of pending jobs and mixing all predictions to schedule job executions in computers cluster and to trigger said renewable electricity source reconfiguration by said smart grid components manager and preferably also maintenance operations on said renewable electricity source. This way, those two intelligent processes, smart grid components manager and workload scheduler, implement most of required components to fully take advantage of this new management of failure risk of renewable electricity source(s). The intelligent part of this new management of failure risk of renewable electricity source(s) is thereby better centralized.

Preferably, it manages several renewable electricity sources, preferably different types of renewable electricity sources, said step of managing failure risk is performed for at least one, preferably several, more preferably most of, even more preferably all of, said renewable electricity sources. This way, the management of failure risk of renewable electricity source is done at a large scale, maximizing the benefits of implementing the method of managing electricity providing in the computers cluster.

Preferably, said renewable electricity sources include one or more: wind turbines, solar panels, hydraulic dams. This way, most of available and efficient renewable electricity sources are used to provide for electricity to the computers cluster, thereby lowering the global price of electricity consumption by the computers cluster, and thereby maximizing the electricity availability irrespective or meteorological conditions.

Preferably, said renewable electricity source reconfiguration includes: for wind turbine: blade orientation modification, neighbor wind turbine synchronizing modification, and/or for solar panel: sensing surface orientation modification, and/or for hydraulic dam: dam gate opening modification. This way, one or more reconfiguration steps for each renewable electricity source allows for better implementing the failure risk of renewable electricity source management according to the invention, thereby lowering the global failure risk of the renewable electricity sources which may be used by the computers cluster.

Preferably, said renewable electricity source reconfiguration in case of extreme meteorological events includes: stopping wind turbine in case of storm, shielding solar panel in case of hail, closing dam gate in case of overflow. This way, one or more reconfiguration steps for each renewable electricity source allows for fully implementing the failure risk of renewable electricity source management according to the invention, thereby minimizing the global failure risk of the renewable electricity sources which may be used by the computers cluster, in a situation where it would have otherwise been quite high.

Preferably, in said step of prediction of electricity availability, electricity availability prediction is computed as a decreasing function of electricity price prediction. This way, the global cost of electricity provided for the computers cluster can be lowered, with a negligible impact on working efficiency of this computers cluster, since existing workload is treated, but most part of it is treated during periods when electricity price is lower, whereas the smallest possible part of it is treated during periods when electricity price is higher.

To take into account failure risk of said renewable electricity source in a more efficient manner, what means with a reduced disturbance in tasks scheduling process, this more precise object is achieved by adding supplementary technical features which allow the need and/or availability of electricity predictions to improve over time until it becomes very efficient and causes a limited disturbance as compared with a tasks scheduling process which would not be cost aware.

This more precise object is achieved with a managing method, wherein said processes of prediction of electricity availability and/or need, and more precisely said processes of prediction of electricity price and/or of workload receive a feedback from said process of scheduling tasks, said processes of prediction improve, based on said feedback.

To take into account electricity price in an even more efficient manner, what means with a very reduced disturbance in tasks scheduling process, this even more precise object is achieved by adding other supplementary technical features which allow the electricity prediction process to improve over time until it becomes fully efficient and causes a very limited disturbance as compared with a tasks scheduling process which would not be cost aware. Indeed, the feedback being based on scheduling performances rather than on price prediction precision, the disturbance effect on scheduling performances will be quickly limited over time. According to embodiments of the invention, it has been discovered that basing the feedback on scheduling performances rather than on price prediction precision (as it would seem more natural), is astonishingly globally more efficient, and more quickly efficient during the learning progress of the electricity price prediction process.

This even more precise object is achieved with a managing method, wherein said feedback, to said process of prediction of electricity price, is based on an evaluation of scheduling performances in said computers cluster more than on an evaluation, if any, of electricity price prediction precision.

To continue to improve the efficiency of the learning progress of the electricity price prediction process, this feedback is done through a cost function.

Preferably, said feedback, to said process of prediction of electricity price, updates a cost function of said process of prediction of electricity price which is based on an evaluation of scheduling performances in said computers cluster more than on an evaluation, if any, of electricity price prediction precision.

To still continue to improve the efficiency of the learning progress of the electricity price prediction process, this feedback is exclusively based on scheduling performances and not at all on price prediction precision.

Preferably, said feedback, to said process of prediction of electricity price, is based on an evaluation of scheduling performances in said computers cluster, and not on an evaluation of electricity price prediction precision.

Preferably, said process of prediction of workload receives a feedback from said process of scheduling tasks, said process of prediction of workload improves, based on said feedback.

Here again, the feedback from scheduling process to workload prediction process improves the quality of workload prediction process over time and its contribution to computers cluster operation improvement.

Preferably, said feedback, to said process of prediction of workload, is based on an evaluation of scheduling performances in said computers cluster more than on an evaluation, if any, of workload prediction precision.

Here again, the feedback from scheduling process to workload prediction process, based on scheduling performances rather than on workload prediction precision, improves the quality of workload prediction process over time more rapidly and more efficiently as well as its contribution to scheduling performances improvement.

To continue to improve the efficiency of the learning progress of the workload prediction process, this feedback is done through a cost function.

Preferably, said feedback, to said process of prediction of workload, updates a cost function of said process of prediction of workload which is based on an evaluation of scheduling performances in said computers cluster more than on an evaluation, if any, of workload prediction precision.

To still continue and improve the efficiency of the learning progress of the electricity price prediction process, this feedback is exclusively based on scheduling performances and not at all on price prediction precision.

Preferably, according to an embodiment of the invention, at least one of said prediction processes, preferably both said prediction processes, are based on using support vector machines.

Preferably, according to an alternative embodiment of the invention, at least one of said prediction processes, preferably both said prediction processes, are based either on using a supervised learning algorithm, preferably a nearest neighbor algorithm or a random forest algorithm, or on using a deep learning algorithm.

Preferably, according to an embodiment of the invention, said process of scheduling tasks is based on using a greedy algorithm, preferably a Backfilling algorithm.

Preferably, according to an alternative embodiment of the invention, said process of scheduling tasks is based on using an integer programming algorithm.

Preferably, said computers cluster comprises more than 1000 terminal nodes, preferably more than 10000 terminal nodes. The method of managing electricity providing in a computers cluster is all the more interesting than the size of this cluster is big.

Preferably, said process of scheduling tasks takes into account an objective of increasing renewable electricity source life expectancy and/or lowering renewable electricity source maintenance frequency while, at the same time, maintaining high computers cluster utilization.

Thereby, a better compromise may be found between on the one hand the global cost of the renewable electricity source investment and maintenance for providing cheaper electricity to the computers cluster and on the other hand the computing cluster use rate. As a result, the computers cluster is still thoroughly used, but significant cost savings are realized with respect to electricity provided to this computers cluster as well as with respect to repair and maintenance cost of all these renewable electricity sources.

Further features and advantages of the invention will appear from the following description of embodiments of the invention, given as non-limiting examples, with reference to the accompanying drawings listed hereunder.

BRIEF DESCRIPTION OF THE DRAWINGS

FIG. 1 shows an example of a system showing the processes used by the managing method according to an embodiment of the invention, and the progress of their interaction.

DETAILED DESCRIPTION OF THE INVENTION

FIG. 1 shows an example of a system showing the processes used by the managing method according to an embodiment of the invention, and the progress of their interaction.

There are three renewable electricity sources which are a set of solar panels 1, a farm of wind mills 2, a group of hydraulic dams 3. There is a computers cluster 9 too. There are also backup rechargeable batteries and the electricity grid, not represented on FIG. 1 for clarity reasons.

There is a workload scheduler 7 which holds a queue of pending jobs and mixes all the information it receives to efficiently manage the energy consumption and distribution, to trigger actions by a smart grid components manager 4 and to schedule job executions for the computers cluster 9. This workload scheduler 7 will also settle when and which maintenance operation is to be done in next future.

There is a smart grid components manager 4 which is dedicated to real time reconfigure the different renewable electricity sources 1, 2 and 3. This real time reconfiguration includes, first for wind turbines, blade orientation modification and/or neighbor wind turbine synchronizing modification, second for solar panels, sensing surface orientation modification, third for hydraulic dams, dam gate opening modification. The actions performed by the smart grid components manager are triggered by the scheduler 7.

Other actions may also be performed by the smart grid components manager 4, in extreme meteorological conditions, when instructed to do so by the scheduler 7. Indeed, in case of such extreme meteorological events, this renewable electricity source reconfiguration includes, first stopping wind turbines 2 in case of storm, second shielding solar panels 1 in case of hail, third closing hydraulic dams' 3 gates in case of overflow. These reconfiguration steps fully implement the failure risk of renewable electricity source management according to the invention, thereby minimizing the global failure risk of the all of renewable electricity sources 1 to 3, which may be used by the computers cluster 9.

There are real time monitoring sensors 5. The real time monitoring sensors 5 are integrated within each of the renewable electricity sources 1 to 3. These real time monitoring sensors 5 may include power sensors, temperature sensors, orientation sensors, synchronization/desynchronization sensors, opening/closing sensors, etc . . . . These real time monitoring sensors 5 send to the scheduler 7 the status of the renewable electricity sources 1 to 3. Based, among other information as the electricity need and availability, on this status, one or more reconfiguration steps for each renewable electricity source 1 to 3 are scheduled by the scheduler 7 and then performed by the smart grid components manager 4, in order to better implement the failure risk of renewable electricity source management, so as to lower the global failure risk of all of the renewable electricity sources 1 to 3 which may provide electricity for the computers cluster 9.

There are an electricity price predicator 6 based on weather forecast and a workload predicator 8. The electricity price predicator 6 based on weather forecast uses historical data about electricity prices with respect to each of the renewable electricity sources 1 to 3, as well as weather forecast coming from an external API (application programming interface). The workload predicator 8 uses historical data about workload of the computers cluster 9, as well as actual sensed workload of this computers cluster 9.

The tasks scheduler 7 gives a feedback both to the electricity price predicator 6 based on weather forecast and to the workload predicator 8, both feedbacks being based rather on scheduling performances than on prediction precisions. Scheduling performances may include, for example, the percentage of required tasks which has been performed, as well as the delays (or periods in advance, if appropriate) with which those tasks have been performed, and the completeness with which these tasks have been performed.

The scheduler 7 schedules tasks within the computers cluster 9, and then measures or determines the scheduling performances of a batch of tasks which have been performed within a given time frame.

There are indeed two prediction processes (or algorithms) 6 and 8 corresponding respectively to the electricity price predicator 6 based on weather forecast and to the workload predicator 8, and a scheduling process (or algorithm) 7 corresponding to the scheduler 7. The prediction processes 6 and 8 predict the electricity price and the computing resource needs. These prediction processes 6 and 8 communicate bi-directionally with the scheduling process 7.

The scheduling process 7 takes into account both prediction processes 6 and 8, as well as the actual state of the system to make scheduling decisions.

The communication between all these processes is an important point to the good progress of the managing method according to embodiments of the invention. The prediction processes 6 and 8 not only tell the predictions but also receive from the scheduling process 7 how helpful these predictions have been for the scheduling performances and in order to improve these scheduling performances.

The prediction processes 6 and 8 can be support vector machines where the inputs are respectively on the one side historical values of electricity price for each of the renewable electricity sources 1, 2 and 3, as well as weather forecast, and on the other side historical computing needs. This kind of prediction process 6 or 8 learns from historical values by assigning new inputs into one category or the other. The number of categories can be very large making these prediction processes 6 and 8 able to predict real numbers with a good precision.

The cost function of these prediction processes 6 and 8 is based on the evaluation of the scheduling performances, instead of being based on the precision of their predictions.

As an alternative, the prediction processes 6 and 8 may use supervised learning algorithm, like nearest neighbor algorithm or random forest algorithm. Deep learning algorithms can also be used instead.

The scheduling process 7 can be a modified version of the backfilling algorithm. This family of greedy algorithms is fast and powerful enough to fulfill the requirements of the managing method according to embodiments of the invention.

As an alternative, the scheduling process 7 may use in some cases an integer programming algorithm, even if it is notably slower.

The invention has been described with reference to preferred embodiments. However, many variations are possible within the scope of the invention.

The invention claimed is:

1. Method of managing electricity providing in a computers cluster (9), comprising:
   a process of prediction of need of electricity (8) provided by at least one renewable electricity source (1, 2, 3) in said computers cluster (9),
   a process of prediction of availability of said electricity (6) provided by said renewable electricity source (1, 2, 3), including:
   a step of managing failure risk of said renewable electricity source (1, 2, 3), by lowering said predicted availability, so as to:
   increase life expectancy of said renewable electricity source (1, 2, 3), and/or lower maintenance frequency of said renewable electricity source (1, 2, 3),
a process of scheduling tasks (7) in said computers cluster (9), based on both said prediction processes (6, 8),
a process of dynamical reconfiguration of said renewable electricity source (1, 2, 3), according both to last need prediction and to last availability prediction, said process of prediction of availability (6) then taking into account renewable electricity source reconfiguration update, and
wherein:
in case of need prediction decrease because of workload decrease, said renewable electricity source (1, 2, 3) will be reconfigured so as:
not running all the time,
and/or not running at full speed when running, and preferably wherein:
in case of need prediction decrease because of workload decrease, said renewable electricity source (1, 2, 3) will be reconfigured so as:
provide extra electricity to the grid if it accepts it at that time, preferably in a stable way,
and/or provide extra electricity to backup rechargeable batteries if they are not sufficiently filled,
or, in case both said grid does not accept and said backup rechargeable batteries are sufficiently filled, said renewable electricity source (1, 2, 3) will be reconfigured so as to automatically fit actual need prediction but not more.

2. Method of managing electricity providing in a computers cluster (9) according to claim 1, wherein:
said process of prediction of availability of said electricity (6) provided by said renewable electricity source (1, 2, 3), also includes:
a step of prediction of electricity price (6) provided by said renewable electricity source (1, 2, 3).

3. Method of managing electricity providing in a computers cluster (9) according to claim 1, wherein:
said process of prediction of need of electricity (8) provided by said renewable electricity source (1, 2, 3) in said computers cluster (9), also includes:
a step of prediction of workload (8) in said computers cluster (9).

4. Method of managing electricity providing in a computers cluster (9) according to claim 3, wherein said step of prediction of workload (8) in said computers cluster (9) is partly based on historical data of said computers cluster (9).

5. Method of managing electricity providing in a computers cluster (9) according to claim 1, wherein said renewable electricity source (1, 2, 3) reconfiguration control is performed by real time sensors (5) integrated in said renewable electricity source (1, 2, 3).

6. Method of managing electricity providing in a computers cluster (9) according to claim 1, wherein:
said process of dynamical reconfiguration of said renewable electricity source (1, 2, 3) uses a smart grid components manager (4),
said process of scheduling tasks (7) in said computers cluster (9) uses a workload scheduler (7) holding a queue of pending jobs and mixing all predictions to schedule job executions in computers cluster (9) and to trigger said renewable electricity source (1, 2, 3) reconfiguration by said smart grid components manager (4) and preferably also maintenance operations on said renewable electricity source (1, 2, 3).

7. Method of managing electricity providing in a computers cluster (9), according to claim 1, wherein at least one of said prediction processes (6, 8), preferably both said prediction processes (6, 8), are based on using support vector machines.

8. Method of managing electricity providing in a computers cluster (9), according to claim 1, wherein at least one of said prediction processes (6, 8), preferably both said prediction processes (6, 8), are based either on using a supervised learning algorithm, preferably a nearest neighbor algorithm or a random forest algorithm, or on using a deep learning algorithm.

9. Method of managing electricity providing in a computers cluster (9), according to claim 1, wherein said process of scheduling tasks (7) is based on using a greedy algorithm, preferably a backfilling algorithm.

10. Method of managing electricity providing in a computers cluster (9), according to claim 1, wherein said process of scheduling tasks (7) is based on using an integer programming algorithm.

11. Method of managing electricity providing in a computers cluster (9), according to claim 1, wherein said process of scheduling tasks (7) takes into account an objective of increasing renewable electricity source (1, 2, 3) life expectancy and/or lowering renewable electricity source (1, 2, 3) maintenance frequency while, at the same time, maintaining high computers cluster (9) utilization.

12. Method of managing resources providing in a computers cluster (9) running jobs according to claim 1, wherein said computers cluster (9) comprises more than 1000 terminal nodes, preferably more than 10000 terminal nodes.

13. Method of managing electricity providing in a computers cluster (9), comprising:
a process of prediction of need of electricity (8) provided by at least one renewable electricity source (1, 2, 3) in said computers cluster (9)
a process of prediction of availability of said electricity (6) provided by said renewable electricity source (1, 2, 3), including:
a step of managing failure risk of said renewable electricity source (1, 2, 3), by lowering said predicted availability, so as to:
increase life expectancy of said renewable electricity source (1, 2, 3),
and/or lower maintenance frequency of said renewable electricity source (1, 2, 3),
a process of scheduling tasks (7) in said computers cluster (9), based on both said prediction processes (6, 8),
a process of dynamical reconfiguration of said renewable electricity source (1, 2, 3), according both to last need prediction and to last availability prediction, said process of prediction of availability (6) then taking into account renewable electricity source reconfiguration update,
wherein:
in case of availability prediction decrease because of extreme meteorological events, said renewable electricity source (1, 2, 3) will be reconfigured so as:
either not running all the time,
and/or not running at full speed when running, and preferably wherein in case of availability prediction decrease because of extreme meteorological events, said renewable electricity source (1, 2, 3) will be reconfigured so as to automatically fit actual need prediction but not more.

14. Method of managing electricity providing in a computers cluster (9) according to claim 13, wherein:

said process of prediction of availability of said electricity (6) provided by said renewable electricity source (1, 2, 3), also includes:
a step of prediction of electricity price (6) provided by said renewable electricity source (1, 2, 3).

15. Method of managing electricity providing in a computers cluster (9) according to claim 13, wherein:
said process of prediction of need of electricity (8) provided by said renewable electricity source (1, 2, 3) in said computers cluster (9), also includes:
a step of prediction of workload (8) in said computers cluster (9).

16. Method of managing electricity providing in a computers cluster (9) according to claim 13, wherein:
said process of prediction of availability (6) also includes:
a step of evaluation of electricity providing at full speed by said renewable electricity source (1, 2, 3), based on weather forecasting data,
and preferably wherein said weather forecasting data come from a source external to said computers cluster (9), preferably from a web application programming interface.

17. Method of managing electricity providing in a computers cluster (9) according to claim 13, wherein:
said process of dynamical reconfiguration of said renewable electricity source (1, 2, 3) uses a smart grid components manager (4),
said process of scheduling tasks (7) in said computers cluster (9) uses a workload scheduler (7) holding a queue of pending jobs and mixing all predictions to schedule job executions in computers cluster (9) and to trigger said renewable electricity source (1, 2, 3) reconfiguration by said smart grid components manager (4) and preferably also maintenance operations on said renewable electricity source (1, 2, 3).

18. Method of managing electricity providing in a computers cluster (9), according to claim 13, wherein said process of scheduling tasks (7) takes into account an objective of increasing renewable electricity source (1, 2, 3) life expectancy and/or lowering renewable electricity source (1, 2, 3) maintenance frequency while, at the same time, maintaining high computers cluster (9) utilization.

19. Method of managing resources providing in a computers cluster (9) running jobs according to claim 13, wherein said computers cluster (9) comprises more than 1000 terminal nodes, preferably more than 10000 terminal nodes.

20. Method of managing electricity providing in a computers cluster (9), comprising:
a process of prediction of need of electricity (8) provided by at least one renewable electricity source (1, 2, 3) in said computers cluster (9),
a process of prediction of availability of said electricity (6) provided by said renewable electricity source (1, 2, 3), including:
a step of managing failure risk of said renewable electricity source (1, 2, 3), by lowering said predicted availability, so as to:
increase life expectancy of said renewable electricity source (1, 2, 3),
and/or lower maintenance frequency of said renewable electricity source (1, 2, 3),
a process of scheduling tasks (7) in said computers cluster (9), based on both said prediction processes (6, 8),
wherein it manages several renewable electricity sources (1, 2, 3), preferably different types of renewable electricity sources (1, 2, 3), said step of managing failure risk is performed for at least one, preferably several, more preferably most of, even more preferably all of, said renewable electricity sources (1, 2, 3),
wherein said renewable electricity sources (1, 2, 3) include one or more: wind turbines (2), solar panels (1), hydraulic dams (3), and
wherein said renewable electricity source (1, 2, 3) reconfiguration includes:
for wind turbine (2):
blade orientation modification,
neighbor wind turbine (2) synchronizing modification,
and/or for solar panel (1):
sensing surface orientation modification,
and/or for hydraulic dam (3):
dam gate opening modification.

21. Method of managing electricity providing in a computers cluster (9), comprising:
a process of prediction of need of electricity (8) provided by at least one renewable electricity source (1, 2, 3) in said computers cluster (9),
a process of prediction of availability of said electricity (6) provided by said renewable electricity source (1, 2, 3), including:
a step of managing failure risk of said renewable electricity source (1, 2, 3), by lowering said predicted availability, so as to:
increase life expectancy of said renewable electricity source (1, 2, 3),
and/or lower maintenance frequency of said renewable electricity source (1, 2, 3),
a process of scheduling tasks (7) in said computers cluster (9), based on both said prediction processes (6, 8),
wherein it manages several renewable electricity sources (1, 2, 3), preferably different types of renewable electricity sources (1, 2, 3), said step of managing failure risk is performed for at least one, preferably several, more preferably most of, even more preferably all of, said renewable electricity sources (1, 2, 3),
wherein said renewable electricity sources (1, 2, 3) include one or more: wind turbines (2), solar panels (1), hydraulic dams (3), and
wherein said renewable electricity source (1, 2, 3) reconfiguration in case of extreme meteorological events includes:
stopping wind turbine (2) in case of storm,
shielding solar panel (1) in case of hail,
closing dam (3) gate in case of overflow.

22. Method of managing electricity providing in a computers cluster (9), comprising:
a process of prediction of need of electricity (8) provided by at least one renewable electricity source (1, 2, 3) in said computers cluster (9),
a process of prediction of availability of said electricity (6) provided by said renewable electricity source (1, 2, 3), including:
a step of managing failure risk of said renewable electricity source (1, 2, 3), by lowering said predicted availability, so as to:
increase life expectancy of said renewable electricity source (1, 2, 3),
and/or lower maintenance frequency of said renewable electricity source (1, 2, 3),
a process of scheduling tasks (7) in said computers cluster (9), based on both said prediction processes (6, 8),
wherein said process of prediction of need of electricity (8) provided by said renewable electricity source (1, 2, 3) in said computers cluster (9), also includes a step of prediction of workload (8) in said computers cluster (9), wherein in said step of prediction of electricity availability (6), electricity availability prediction is computed as a decreasing function of electricity price prediction, wherein said step of prediction of electricity price (6) receives a feedback from said process of scheduling tasks (7), said step of prediction of electricity price (6) improves, based on said feedback, and wherein said feedback, to said step of prediction of electricity price (6), is based on an evaluation of scheduling performances in said computers cluster (9) more than on an evaluation, if any, of electricity price prediction precision, preferably said feedback, to said step of prediction of electricity price (6), updates a cost function of said step of prediction of electricity price which is based on an evaluation of scheduling performances in said computers cluster (9) more than on an evaluation, if any, of electricity price prediction precision, more preferably said feedback, to said step of prediction of electricity price (6), is based on an evaluation of scheduling performances in said computers cluster (9), and not on an evaluation of electricity price prediction precision.

23. Method of managing electricity providing in a computers cluster (9), according to claim 22, wherein said process of scheduling tasks (7) takes into account an objective of increasing renewable electricity source (1, 2, 3) life expectancy and/or lowering renewable electricity source (1, 2, 3) maintenance frequency while, at the same time, maintaining high computers cluster (9) utilization.

24. Method of managing resources providing in a computers cluster (9) running jobs according to claim 22, wherein said computers cluster (9) comprises more than 1000 terminal nodes, preferably more than 10000 terminal nodes.

25. Method of managing electricity providing in a computers cluster (9), comprising:
a process of prediction of need of electricity (8) provided by at least one renewable electricity source (1, 2, 3) in said computers cluster (9),
a process of prediction of availability of said electricity (6) provided by said renewable electricity source (1, 2, 3), including:
a step of managing failure risk of said renewable electricity source (1, 2, 3), by lowering said predicted availability, so as to:
increase life expectancy of said renewable electricity source (1, 2, 3),
and/or lower maintenance frequency of said renewable electricity source (1, 2, 3),
a process of scheduling tasks (7) in said computers cluster (9), based on both said prediction processes (6, 8),
wherein said process of prediction of need of electricity (8) provided by said renewable electricity source (1, 2, 3) in said computers cluster (9), also includes a step of prediction of workload (8) in said computers cluster (9),
wherein said step of prediction of workload (8) receives a feedback from said process of scheduling tasks (7), and said step of prediction of workload (8) improves, based on said feedback, and
wherein said feedback, to said step of prediction of workload (8), is based on an evaluation of scheduling performances in said computers cluster (9) more than on an evaluation, if any, of workload prediction precision, preferably said feedback, to said step of prediction of workload (8), updates a cost function of said step of prediction of workload which is based on an evaluation of scheduling performances in said computers cluster (9) more than on an evaluation, if any, of workload prediction precision, more preferably said feedback, to said step of prediction of workload (8), is based on an evaluation of scheduling performances in said computers cluster (9), and not on an evaluation of workload prediction precision.

26. Method of managing electricity providing in a computers cluster (9), according to claim 25, wherein said process of scheduling tasks (7) takes into account an objective of increasing renewable electricity source (1, 2, 3) life expectancy and/or lowering renewable electricity source (1, 2, 3) maintenance frequency while, at the same time, maintaining high computers cluster (9) utilization.

27. Method of managing resources providing in a computers cluster (9) running jobs according to claim 25, wherein said computers cluster (9) comprises more than 1000 terminal nodes, preferably more than 10000 terminal nodes.

* * * * *